United States Patent [19]

Behrens

[11] Patent Number: 5,403,243
[45] Date of Patent: Apr. 4, 1995

[54] COMPACT ELEVATION DRIVE MECHANISM

[75] Inventor: Edward H. Behrens, Cheshire, Mass.

[73] Assignee: Martin Marietta Corporation, King of Prussia, Pa.

[21] Appl. No.: 74,555

[22] Filed: Jun. 11, 1993

[51] Int. Cl.⁶ .............................................. F16H 1/28
[52] U.S. Cl. ..................................... 475/149; 475/343; 89/1.816; 33/1 PT
[58] Field of Search ....................... 475/149, 331, 343; 89/1.816, 41.01, 41.02; 192/20; 33/1 PT, 534, 538; 359/429, 430

[56] References Cited

U.S. PATENT DOCUMENTS

| | | | |
|---|---|---|---|
| 516,917 | 3/1894 | Coleman | 475/149 |
| 1,898,753 | 2/1933 | Wente | 475/149 |
| 2,436,582 | 2/1948 | Lear | 89/41.02 |
| 2,547,165 | 4/1951 | Mladek | 475/149 |
| 2,693,322 | 11/1954 | Mercier | 192/20 |
| 4,305,325 | 12/1981 | Lange et al. | 89/1.816 |
| 4,764,881 | 8/1988 | Gagnon | 359/430 |
| 4,771,545 | 9/1988 | Hisayasu et al. | 359/430 |

FOREIGN PATENT DOCUMENTS 1019430  2/1966  United Kingdom .............. 89/41.01

Primary Examiner—Edward K. Look
Assistant Examiner—Christopher Verdier
Attorney, Agent, or Firm—Geoffrey H. Krauss

[57] ABSTRACT

An elevation mechanism, for changing the elevation angle of an attachable container subassembly, has an outer housing having an integral portion for mounting the container subassembly, and an inner housing having an exterior surface about which the outer housing is rotatably supported. A motor within the inner housing supplies torque to a gear train, which includes a planetary gear system for rotating the outer housing and the container subassembly attachable thereto, with respect to the inner housing. The inner housing can be fastened to a surface, generally in the vertical plane, with respect to which surface the rotating outer housing moves the container subassembly in adjustable elevation disposition.

29 Claims, 2 Drawing Sheets

COMPACT ELEVATION DRIVE MECHANISM

BACKGROUND OF THE INVENTION

The present invention relates to elevation drive mechanisms and, more particularly, to a novel compact and lightweight elevation drive mechanism for rotating a storage container from a rest position to a use position.

It is often necessary to provide a compact and lightweight drive mechanism for changing the elevation angle of a case, platform or other box-like container or similar structure. This is especially true in those cases where the container is varied in azimuthal orientation by movement, such as rotation, of the structure to which the elevation mechanism is itself mounted. For example, elongated box-like containers for lighting mechanisms, such as small searchlights, lasers and the like, or single-tube rocket or missile launchers and the like, may be mounted upon the turret of a vehicle, with the turret being rotated in the horizontal plane to change the azimuth angle of the container with respect to the nominal pointing direction of the vehicle itself, and with a separate elevation drive, mounted to the side of the turret, being utilized to change the angular aspect, with respect to the horizontal plane, so that full steering in the elevation-azimuth manner is achieved. It is also highly desirable to provide an elevation mechanism with symmetry allowing the container to be equally as well mounted to either side of a substantially vertical member without requiring elevation drive modification.

BRIEF SUMMARY OF THE INVENTION

In accordance with the invention, an elevation mechanism for changing the elevation angle of an attachable container subassembly, utilizes an outer housing having an integral portion for mounting the container subassembly; an inner housing having an exterior surface and means for rotatably supporting the outer housing about the exterior surface; means within the inner housing for supplying torque; and gear train means, receiving the torque from the supplying means, for rotating the outer housing portion, and the container subassembly attachable thereto, with respect to the inner housing portion. The inner housing is provided with means for fastening to a surface, generally in the vertical plane, with respect to which surface the rotating outer housing moves the container subassembly in adjustable elevation disposition thereto.

In the presently preferred embodiment, the gear train means has a train formed of a plurality of pinion/gear combinations, with a planetary gear system being utilized at the output of the gear train; a ring member of the planetary system is attached to the inner housing and the shafts of the planetary gears are attached for rotation of the outer housing with respect to the inner housing/ring gear combination.

Accordingly, it is an object of the present invention to provide a novel elevation drive mechanism for modifying the elevation angle of an attachable container subassembly.

This and other objects of the present invention will become apparent upon reading the following detailed description, when considered in conjunction with the associated drawings.

DETAILED DESCRIPTION OF A PRESENTLY PREFERRED EMBODIMENT OF THE INVENTION

Figure 1:
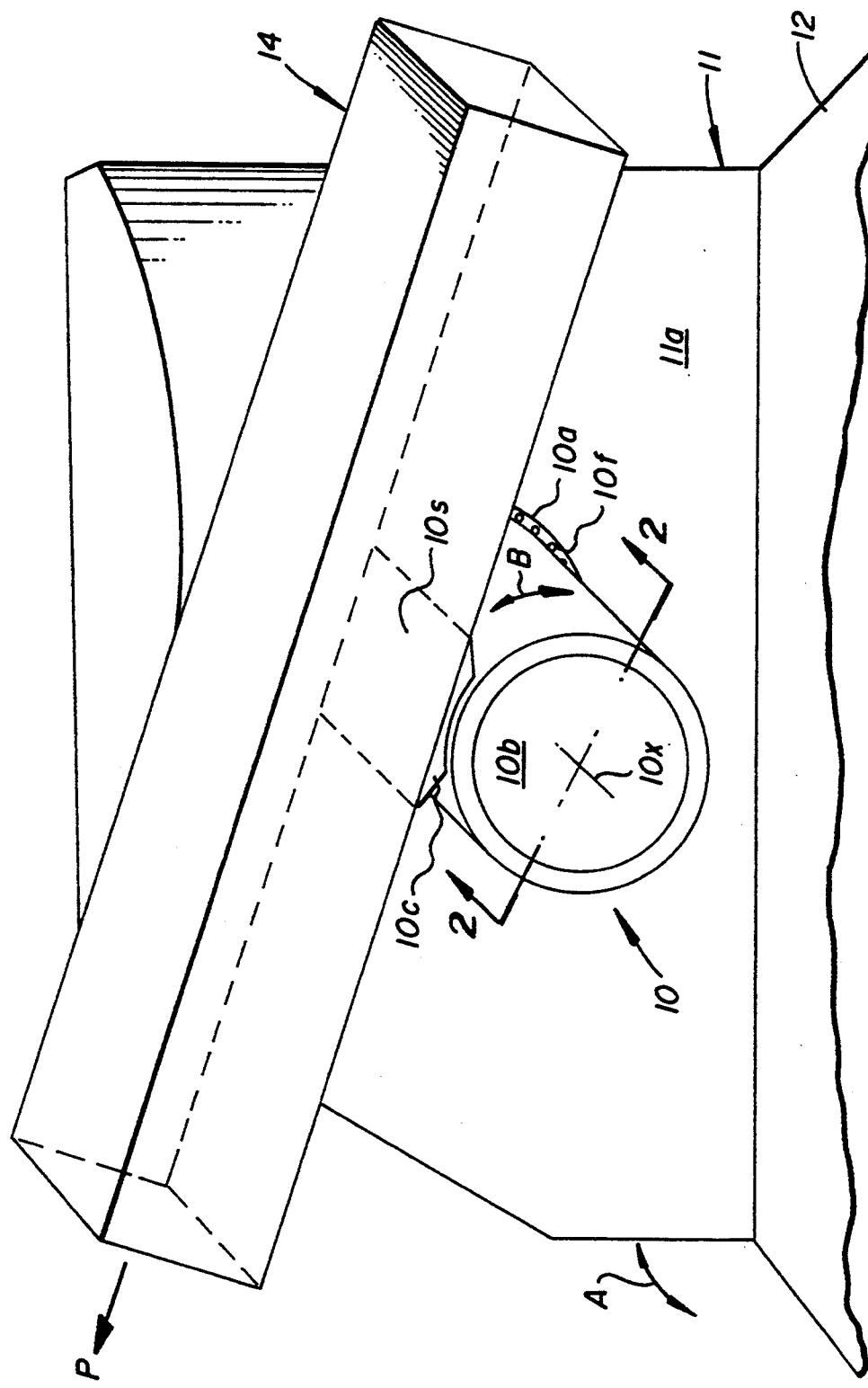
FIG. 1 is a prospective view of a container assembly and of a drive mechanism, in accordance with the principles of the present invention, for changing the elevation of the container with respect to a supporting (turret) assembly.

Referring initially to FIG. 1, a compact and lightweight elevation drive mechanism 10 has a generally cylindrical shape, about an axis 10x. The mechanism has a mounting means 10a, such as a flange formation provided at one end thereof opposite a closed end 10b, for fastening, as with fastening means 10f, the mechanism to a wall portion 11a of a structural object 11, such as a substantially vertical wall portion of a rotatable turret mounted upon a mounting portion 12. Elevator mechanism 10 has a portion 10c upon its exterior surface providing a level mounting surface 10s upon which a container structural subassembly 14, such as a case in which a light assembly, missile launcher or the like, can be encased. The object within container subassembly 14 is to be pointed in the direction of arrow P, as subassembly 14 is varied in the horizontal plane, as shown by arrows A, by rotation of turret means 11, and is moved in the vertical plane, as shown by arrows B, by rotation of the exterior support portion 10c of the elevation drive means 10 about housing axis 10x. It will be seen that pointing arrow P can thus be moved to any point upon a spherical surface, or any portion thereof, by adjustment of azimuth (arrow A) and elevation (arrow B).

Figure 2:
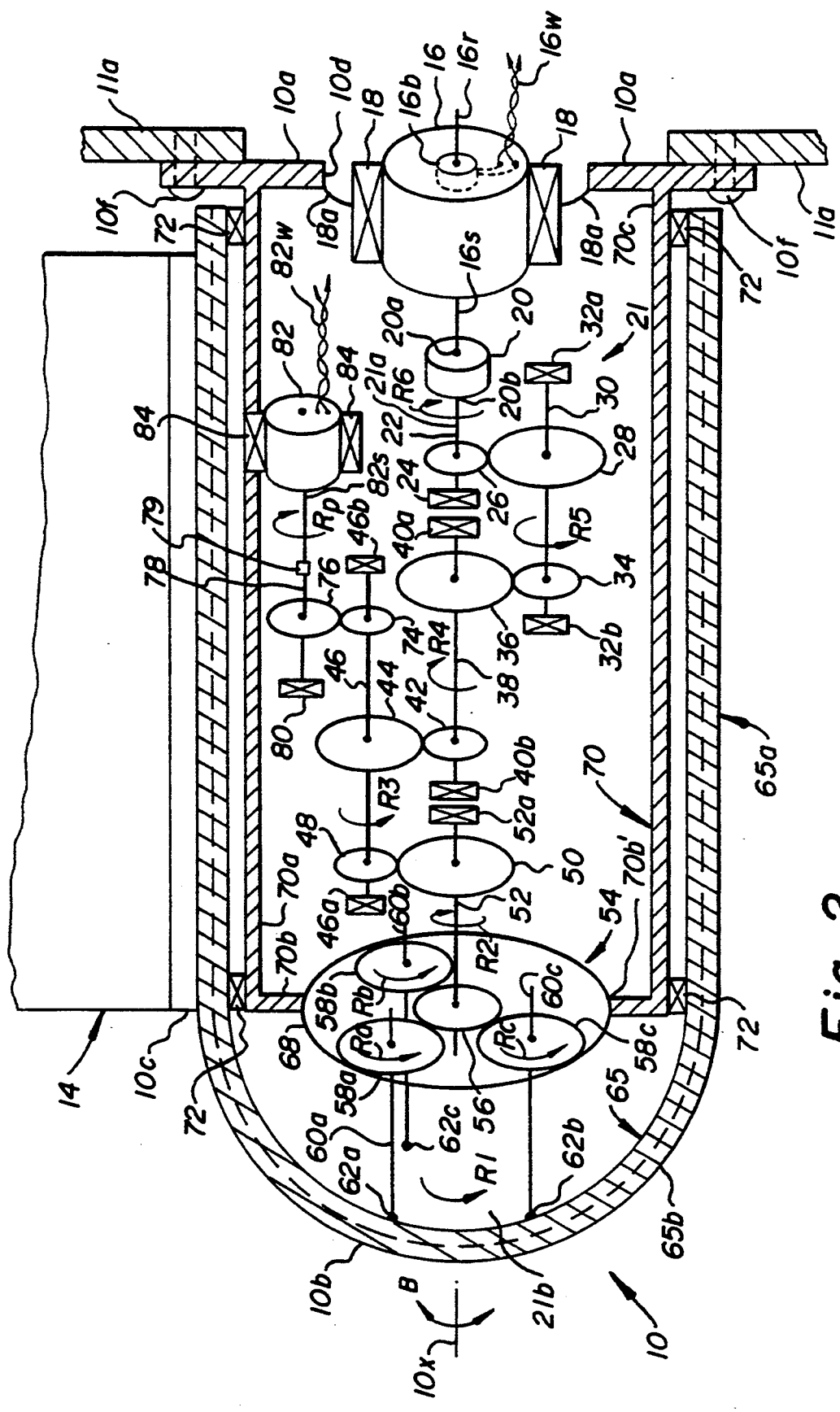
FIG. 2 is a schematic sectional drawing illustrating the internal mechanism of this presently preferred elevation drive mechanism embodiment.

Referring now to FIG. 2, elevation means 10 utilizes a source 16 of mechanical torque, such as motor means 16 having a shaft 16s which is rotated responsive to electrical power provided to the motor via wiring means 16w; motor unit 16 may also include suitable tachometer means (which provide output via other wires in wiring harness 16w) and a brake means 16B (of manual and/or electrical-actuated type, with the former type being actuated by a release means 16r and the latter type being actuated by other wires in harness 16w). The motor/tachometer/brake means 16 is rigidly mounted, via mounting means 18, to the elevation drive mechanism stationary inner end (or mounting flange) portion 10a, within an aperture 10d thereof; a dust shield means 18a, as well-known to the art, can extend across any portion of opening 10d not filled with motor means 16, its mounting means 18, or associated electrical or mechanical components. The motor shaft 16s is connected to the input end 20a of a slip clutch means 20 having a rotatable output end 20b which is attached to an input 21a of a gear train means 21.

The gear train means 21 starts with a first shaft 22, caused to rotate either in the direction of arrow R6 or the opposite direction, dependent upon the directional rotation of motor shaft 16s responsive the electrical signals received by harness 16w. Shaft 22 is supported for rotation by mounting means 24, and has a first pinion 26 mounted thereon (pinion 26 may be a 20 pitch, 19 tooth gear in one illustrated embodiment). A mating gear 28 has teeth of identical pitch (e.g. gear 28 being a 20 pitch, 71 tooth gear) to mesh with the pitch of the teeth in pinion 26. Gear 28, supported on a second shaft, or axle, 30, in mounting means 32a and 32b at opposite shaft ends, rotates responsive to movement of pinion 26, and rotates in the direction of arrow R5 when gear 26 rotates in the direction of arrow R6. Responsive to the clockwise rotation of shafts 16s and 22, and therefore of gear 26, gear 28 rotates in a counterclockwise direction, to rotate a second pinion gear 34, supported on shaft 30, in the same counterclockwise direction, as shown by arrow R5. The teeth of pinion gear 34 mesh with the like-pitched teeth of another mating gear 36; illustratively, second pinion 34 is a 16 pitch 17 tooth gear, and mating gear 36 is a 16 pitch 55 tooth gear). Gear 36 thus rotates in the same direction as gear 26, e.g. in a clockwise direction as shown by arrow R4, rotating a companion gear 42 in the same direction R4; shaft 38 is supported in mounts 40a and 40b at the opposite ends thereof. The third pinion gear 42, being attached to gear 36, will thus rotate in the clockwise direction in the example given. Meshing with pinion 42 is a mating gear 44, which now rotates in the counterclockwise direction as shown by arrow R3, causing the attached axle shaft 46 to rotate in the same direction, in its rotation mounts 46a and 46b. Illustratively, pinion gear 42 is a 16 pitch, 17 tooth gear and gear 44 is a 16 pitch, 55 tooth gear. The rotation R3 of shaft 46 causes an associated fourth pinion gear 48 to rotate in a counterclockwise direction, causing its teeth to mesh with teeth of another gear 50 which will now rotate in a direction R2 which is illustratively clockwise. Gear 50 causes the attached axle shaft 52 to rotate in the same direction, as supported by rotational mount 52a. (Illustratively, pinion gear 48 is a 12 pitch, 17 tooth gear, while gear 50 is a 12 pitch, 37 tooth gear). Shaft 52 is the input to a planetary gear subsystem 54 having a central or "sun" gear 56 (a 10 pitch, 15 tooth gear) whose teeth mesh with and turn three planetary gears 58a, 58b and 58c, each driving its associated axle shaft 60a, 60b and 60c, respectively. Each of the identical planetary gears is a 10 pitch, 27 tooth gear. Each planetary gear axle 60 is retained by associated one of retainer means 62a, 62b and 62c, mounted upon the interior surface of an end bell portion 65b of the elevation mechanism outer housing 65. Thus, responsive to rotation of motor shaft 16s (say in the illustrated clockwise direction), the gears 58a/58b/58c rotate (say in the direction of arrows Ra/Rb/Rc) so that the end bell of the outer housing is rotated (say in the counterclockwise direction, as shown by arrow R1), causing the outer housing cylindrical portion 65a to rotate; if the motor shaft 16s reverses direction of rotation, the outer housing rotation direction will be reversed. Thus the elevation drive housing 65 rotates in direction of arrows B about mechanism axis 10x, moving coupling portion 10c to adjust the elevation of container subassembly 14.

The planetary gear subsystem 54 has an outer ring gear 68, of the same pitch and with teeth meshing with the planetary gear 58a/58b/58c teeth (e.g. a 10 pitch, 69 tooth ring gear in this example); the ring gear 68 has an exterior periphery fitting within an aperture 70b' in an end surface 70b of an elevation mechanism inner housing 70. The opposite end 70c of the inner housing wall is attached to the elevation mechanism stationary mounting (flange) portion 10a. Several means 72 (such as ball-bearing races and the like) are provided between inner housing 70 and outer housing 65, for rotation of the latter about the former. By way of illustration only, it will be seen that with the gear tooth ratios given, the housing exterior case 65 will make one rotation R1 for every 476.75 rotations of motor shaft 16s in the opposite direction. Size can be minimized by aligning the input axle 22, the middle axle 38 and the output axle 52 along the mechanism axis 10x, which is also the axis of cylindrical housings 65 and 70.

Shaft 46 is also coupled to a second pinion gear 74, which mates with and rotates companion gear 76 and attached shaft 78 in the direction of rotational arrow Rp, for motor shaft rotation in the direction of arrow R6. Shaft 78 is mounted for rotation by a coupling means 79, mounting means 80 and the shaft 82s of a position and limit potentiometer means 82. The potentiometer 82 is mounted, via mounting means 84, to the stationary internal housing 70. The potentiometer provides an output, via wires of a wiring harness 82w, which indicates the relative rotational (elevation) position of the outer housing 65 with respect to the stationary inner housing 70. If pinion gear 74 is a 48 pitch, 36 tooth gear and the associated potentiometer gear 76 is a 48 pitch, 60 tooth gear, then the potentiometer shaft 82s will have about 7.31 revolutions for each revolution of the rotatable exterior housing 65 about axis 10x; i.e. a 1-turn precision potentiometer will allow coverage of a 49° arc, which would cover from some selected vertical elevation (say, ±35°) to some selected depressed angle (say, −14°).

It will be seen that, by use of a planetary gear subsystem 54, with multiple planetary gears, each having a shaft providing output to the rotatable external housing, the gear ratio-to-volume can be maximized and load sharing in the more-highly-loaded planetary gears can be achieved. It will be seen that, because the housing not only contains the gear box but is also the member supporting the case subassembly 14, other structural members can be dispensed with. Also, it will be seen that rotational symmetry, about axis 10x, will allow the entire mechanism 10 to be rotated 180 degrees and "flipped over" so that the elevation mechanism can extend rightwardly from another vertical wall, thus making the mechanism mountable on either side of the turret, without modification. It will also be seen that the motor means 16 essentially extends into the elevation drive inner housing, and does not necessarily penetrate into the turret volume, thereby allowing elevation mechanism capability to be provided to virtually any structure, turret and the like, having a generally vertically-disposed wall portion 11a. Further, in hazardous environments, if the exterior housing 65 is made of suitable construction (armor or other exterior-impervious material), the interior housing 70 and its gear/motor mechanisms can be somewhat protected from the environment.

While one presently preferred embodiment of my novel elevation drive mechanism has been described in some detail herein, many variations and modifications will now become apparent to those skilled in the art. It is my intent, therefore, to be limited only by the scope of the appending claims and not by the specific details and instrumentalities presented by way of description herein.

What is claimed is:

1. An elevation mechanism for changing an elevation angle of a container subassembly attachment portion, comprising;

an outer housing having an integral attachment portion for mounting the container subassembly;

an inner housing having an exterior surface and means for rotatably supporting the outer housing about the exterior surface;

means within the inner housing for supplying torque; and gear train means, receiving the torque from the supplying means, for rotating the outer housing portion, and the container subassembly attachable thereto, with respect to the inner housing portion, comprising; a plurality of entrained pinion and gear combinations receiving torque; a planetary gear subsystem coupled to an output of the entrained combinations and having an output rotating said outer housing, a ring gear supported by said inner housing, a sun gear connected to the entrained combinations, and three planetary gears, each having a shaft mounted to said outer housing for simultaneously providing rotational torque thereto.

2. The mechanism of claim 1, wherein said torque supplying means includes: a motor having a rotating shaft; and a slip clutch positioned between the motor shaft and an input to said gear combinations.

3. The mechanism of claim 2, wherein said motor includes brake means.

4. The mechanism of claim 3, wherein said motor includes a manual brake means release.

5. The mechanism of claim 1, wherein the gear combination includes a plurality of pinion gear-spur gear pairs.

6. The mechanism of claim 5, wherein four pairs of gears are used between the torque means and the planetary gear subsystem.

7. The mechanism of claim 1, wherein the outer housing has an end cap which receives the output torque of said gear train means.

8. The mechanism of claim 7, wherein said outer housing encloses and substantially protects said inner housing, said torque-providing means and said gear train means.

9. The mechanism of claim 8, wherein said outer housing is formed of an armor material.

10. The mechanism of claim 7, further including means for facilitating rotation of said outer housing about said inner housing.

11. The mechanism of claim 1, further including means coupled to said gear train means for indicating the amount of rotation of said mechanism, with respect to a reference.

12. The mechanism of claim 1, in combination with a container assembly mounted upon the container subassembly attachment portion.

13. The mechanism of claim 1, wherein the container subassembly is a launcher for a missile weapon.

14. An elevation mechanism for changing an elevation angle of a container subassembly attachment portion, comprising:

an outer housing having an integral attachment portion to which the container subassembly is mountable;

an inner housing having an exterior surface, means for rotatably supporting the outer housing about the exterior surface, and means for fastening the inner housing to a surface, generally in the vertical plane, with respect to which surface the rotating outer housing moves the container subassembly attachment portion in adjustable elevation disposition thereto;

means within the inner housing for supplying torque; and gear train means, receiving the torque from the supplying means, for rotating the outer housing portion, and the container subassembly attachment portion thereon, with respect to the inner housing portion.

15. The mechanism of claim 14, wherein the fastening means allows the mechanism to be positioned in a selected one of a pair of opposite horizontal senses with respect to the surface on which the mechanism is mounted.

16. The mechanism of claim 14, wherein the gear train means comprises: a plurality of entrained pinion and gear combinations receiving torque; and a planetary gear subsystem coupled to an output of the entrained combinations and having an output rotating said outer housing.

17. The mechanism of claim 16, wherein the gear combination includes a plurality of pinion gear-spur gear pairs.

18. The mechanism of claim 17, wherein four pairs of gears are used between the torque means and the planetary gear subsystem.

19. The mechanism of claim 16, wherein the planetary gear subsystem includes: a ring gear supported by said inner housing; a sun gear connected to the entrained combinations; and three planetary gears, each having a shaft mounted to said outer housing for simultaneously providing rotational torque thereto.

20. The mechanism of claim 19, wherein said torque supplying means includes: a motor having a rotating shaft; and a slip clutch positioned between the motor shaft and an input to said gear combinations.

21. The mechanism of claim 20, wherein said motor includes brake means.

22. The mechanism of claim 21, wherein said motor includes a manual brake means release.

23. The mechanism of claim 14, wherein the outer housing has an end cap which receives the output torque of said gear train means.

24. The mechanism of claim 23, wherein said outer housing encloses and substantially protects said inner housing, said torque-providing means and said gear train means.

25. The mechanism of claim 24, wherein said outer housing is formed of an armor material.

26. The mechanism of claim 23, further including means for facilitating rotation of said outer housing about said inner housing.

27. The mechanism of claim 14, further including means coupled to said gear train means for indicating the amount of rotation of said mechanism, with respect to a reference.

28. The mechanism of claim 14, in combination with a container assembly mounted upon the container subassembly attachment portion.

29. The mechanism of claim 14, wherein the container subassembly is a launcher for a missile weapon.

* * * * *